Jan. 10, 1956   J. B. BARTOW ET AL   2,730,566
METHOD AND APPARATUS FOR X-RAY FLUOROSCOPY
Filed Dec. 27, 1949   7 Sheets-Sheet 1

Inventors:
John B. Bartow
Grey D. MacLaughlin Jr.
by their Attorneys
Howson & Howson

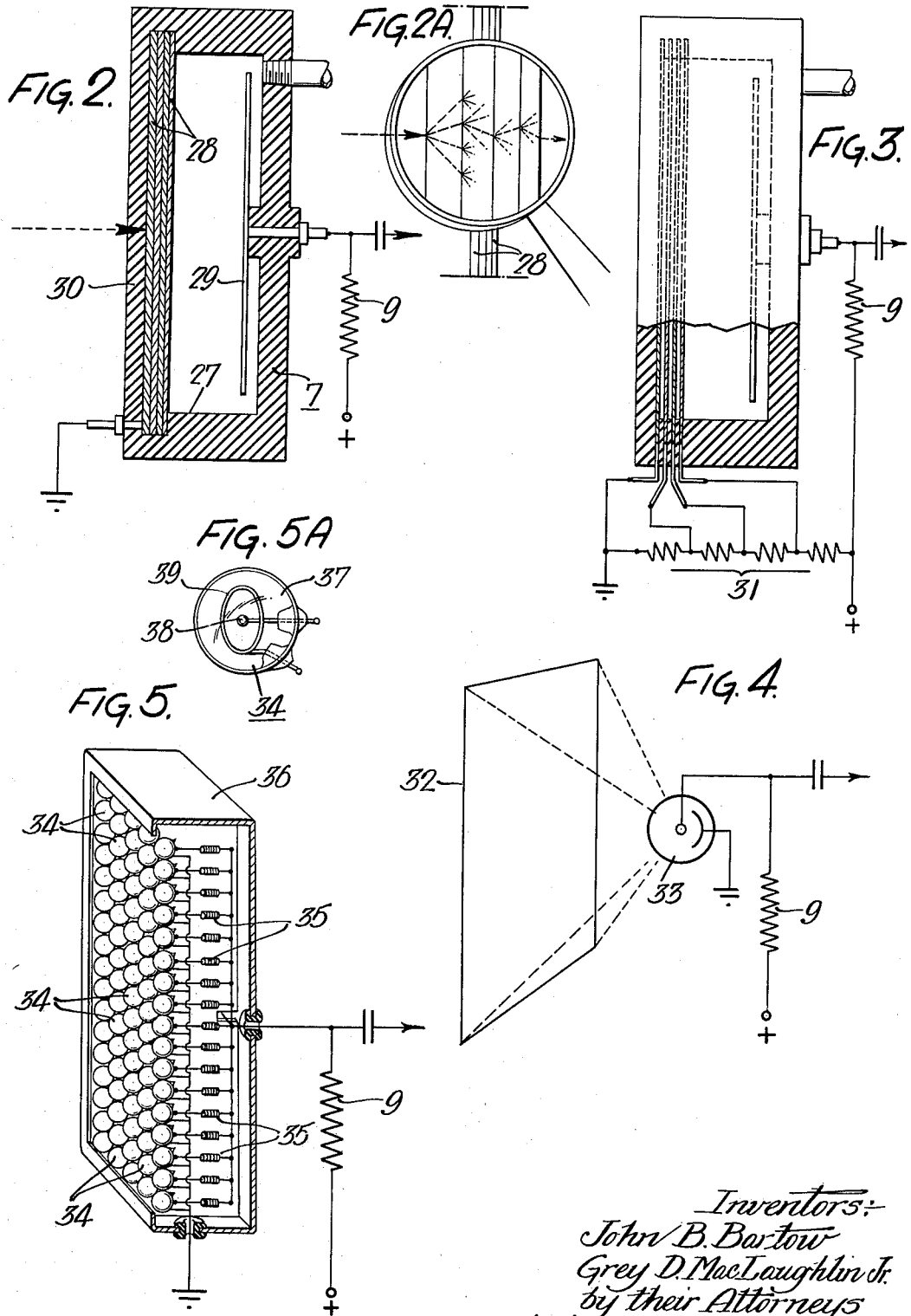

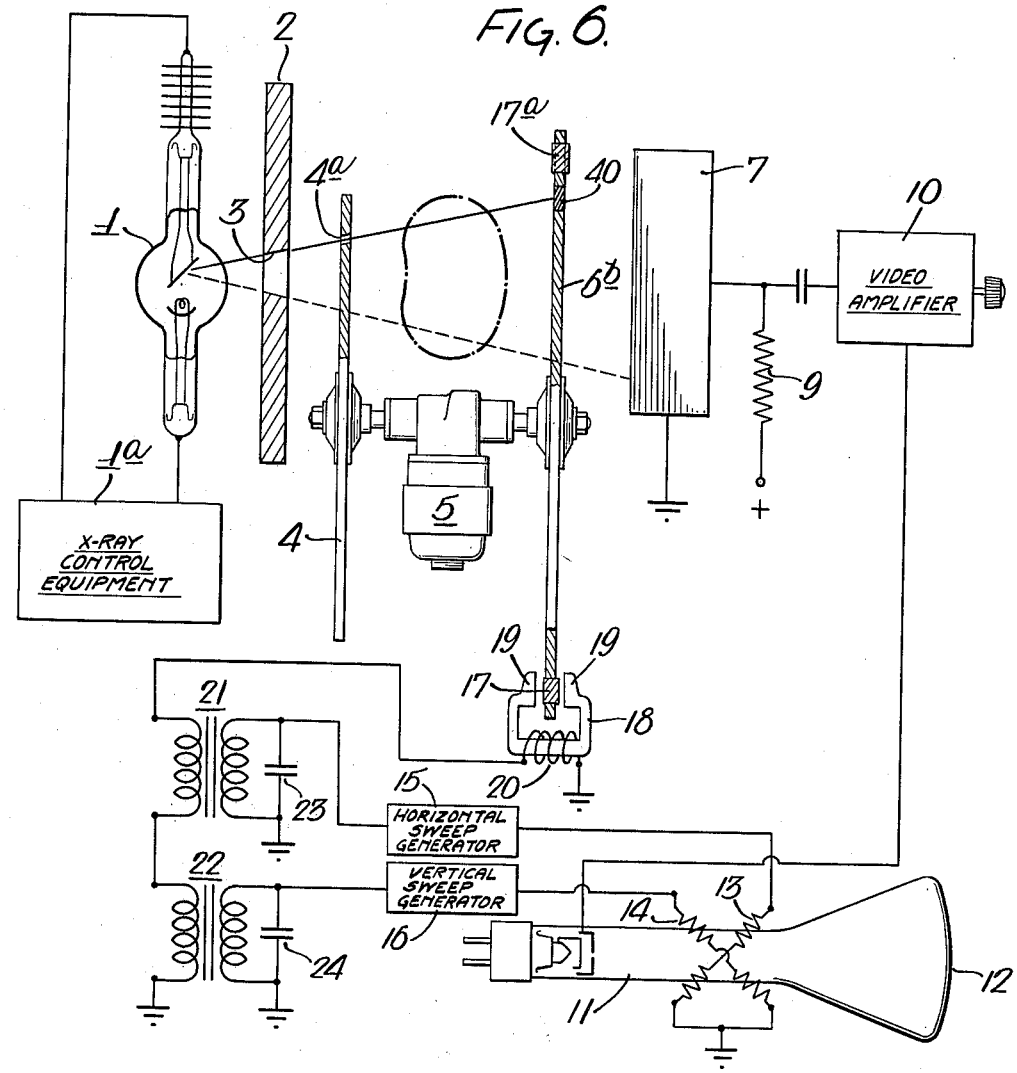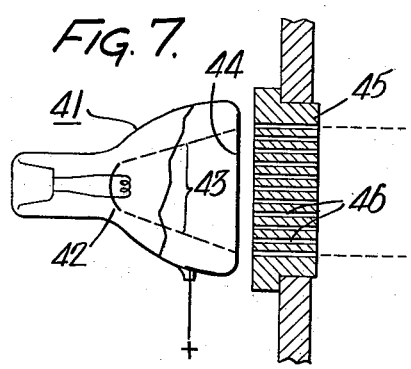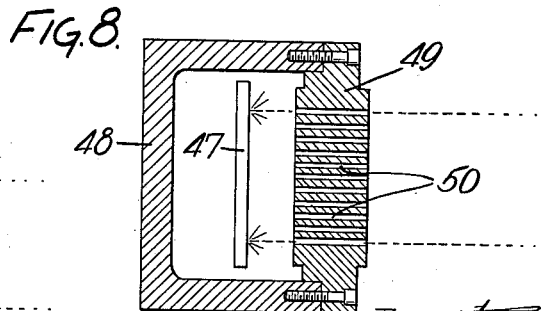

Jan. 10, 1956  J. B. BARTOW ET AL  2,730,566
METHOD AND APPARATUS FOR X-RAY FLUOROSCOPY
Filed Dec. 27, 1949  7 Sheets-Sheet 4
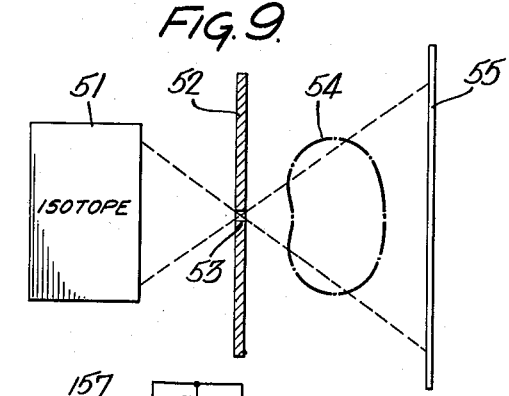
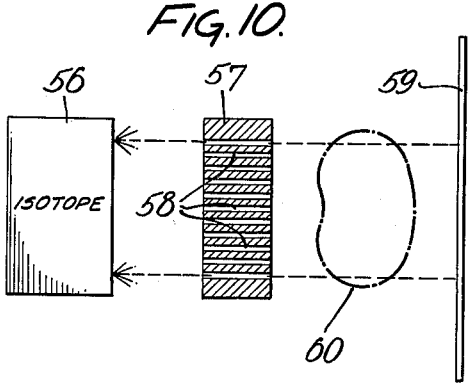
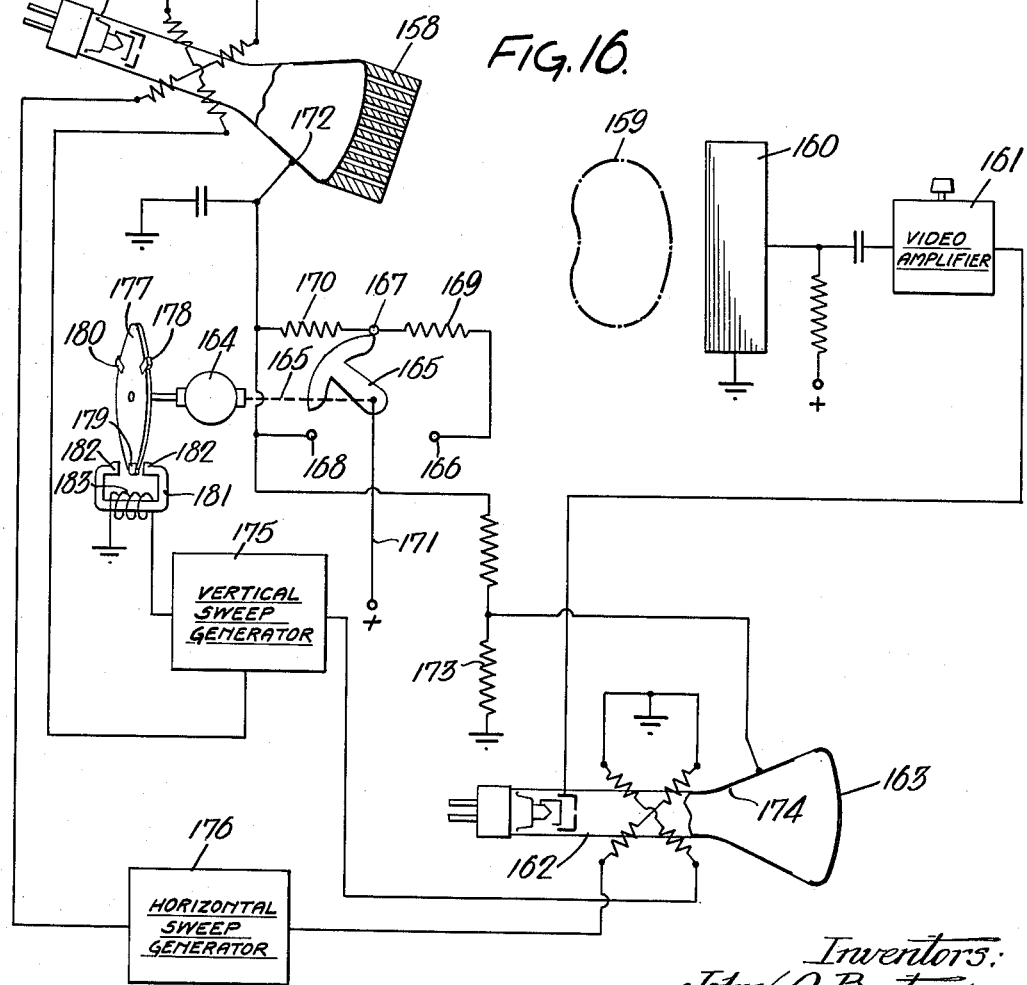
Inventors:
John A. Bartow
Grey D. MacLaughlin
by their Attorneys
Howson & Howson

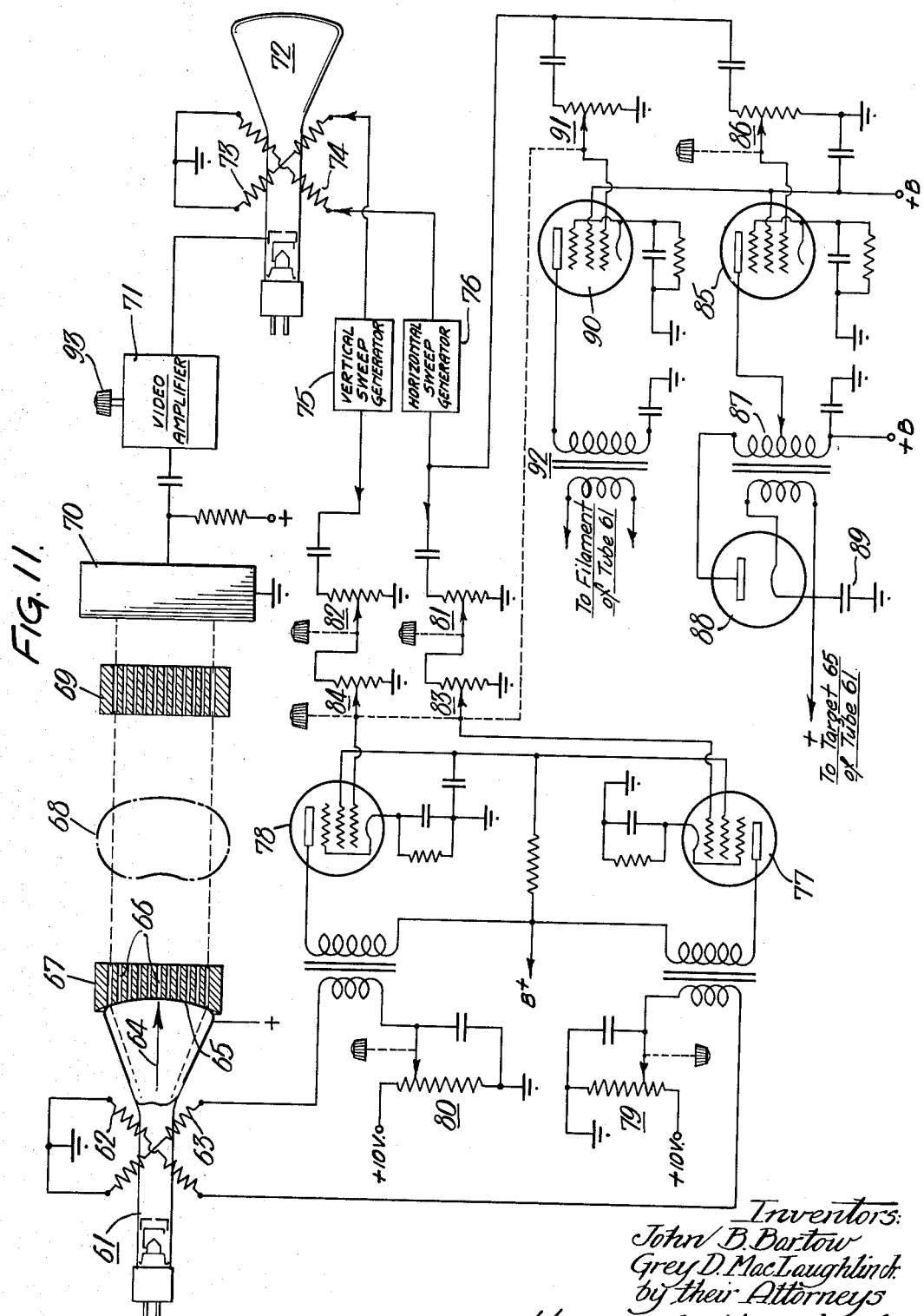

Jan. 10, 1956   J. B. BARTOW ET AL   2,730,566
METHOD AND APPARATUS FOR X-RAY FLUOROSCOPY
Filed Dec. 27, 1949   7 Sheets-Sheet 6

Inventors:
John B. Bartow
Grey D. McLaughlin
by their Attorneys
Howson & Howson

Jan. 10, 1956     J. B. BARTOW ET AL     2,730,566
METHOD AND APPARATUS FOR X-RAY FLUOROSCOPY
Filed Dec. 27, 1949     7 Sheets-Sheet 7
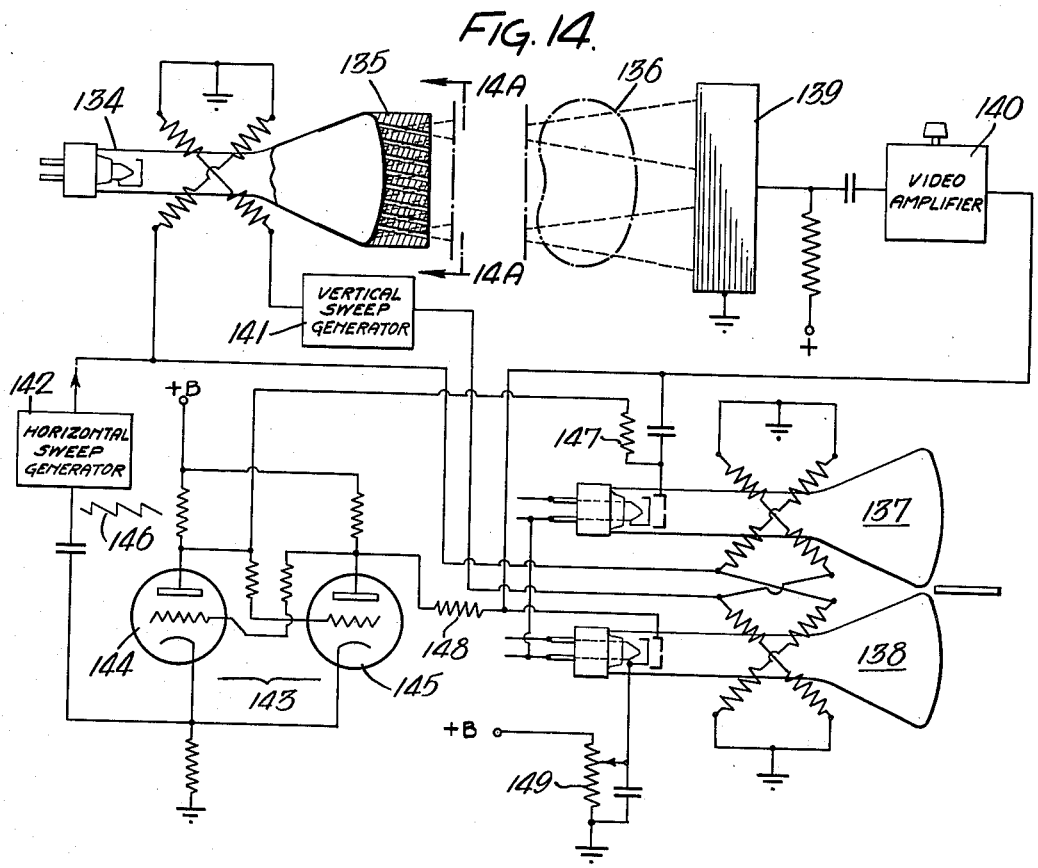
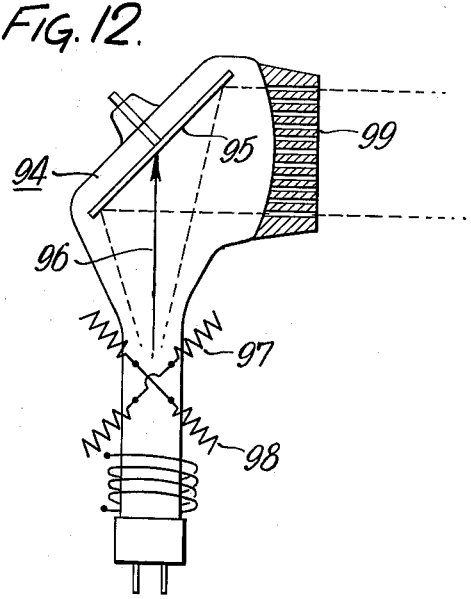
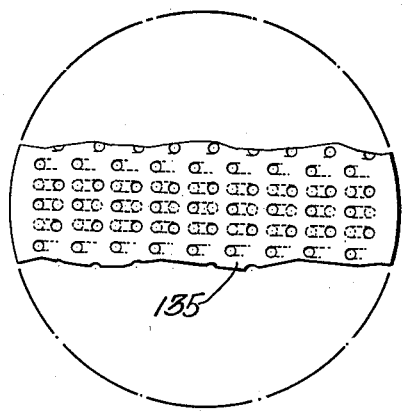
Inventors:
John B. Bartow
Grey D. MacLaughlin
by their Attorneys
Howson & Howson

United States Patent Office 2,730,566
Patented Jan. 10, 1956

2,730,566

METHOD AND APPARATUS FOR X-RAY FLUOROSCOPY

John B. Bartow, Blue Bell, and Grey D. MacLaughlin, Jr., Perkiomenville, Pa., assignors to Bartow Beacons, Inc., Blue Bell, Pa., a corporation of Pennsylvania Application December 27, 1949, Serial No. 135,071

15 Claims. (Cl. 178—6.5)

This invention relates to X-ray fluoroscopy and to novel systems and devices for use therein.

The principal object of this invention is to provide a novel system of X-ray fluoroscopy that provides brilliant images that may be viewed in an illuminated room, and is adaptable to multiple screen viewing suitable for instruction and classroom work, and in which the X-ray intensities required are low enough to permit operative techniques by a surgeon with a minimum of danger from X-ray exposure.

A further object of the invention is to provide a novel system of stereoscopic X-ray fluoroscopy utilizing low intensity X-rays.

Another object is to provide a novel system of X-ray fluoroscopy which makes use of color.

Heretofore the use of X-rays for visual inspection, i. e. fluoroscopy, has involved the use of relatively strong X-ray radiation to permit sufficient fluorescence of a screen to be visible to the eye. The order of illumination intensity produced by even the modern type screen is very low and requires the viewer to be "dark adapted" to permit satisfactory viewing of the image. To become dark adapted requires approximately ten minutes in a darkened room with attendant disadvantages. In fact due to the low intensities of screen illumination, the eye uses "rod" vision which is limited in resolving power, or fine detail recognition, and is color blind. To permit "cone" vision, normal daytime vision, would require screen illumination intensities of approximately 100 times the present screen level. But even at present low screen illumination, the X-ray intensities used are so high that the actual examination time of a patient is limited to avoid over exposure to X-ray. It is extremely hazardous for a doctor to do much work under fluoroscopy where his hands are exposed to the direct beam, such as bone fracture repair etc. Routine fluoroscopy involves considerable risk to the examiner even when precautions are observed, as X-rays are cumulative in their effect and a series of small doses at different times add up, with resultant tissue damage.

Several systems of stereoscopic fluoroscopy have been developed but such systems have required approximately twice normal X-ray exposure during use and as a result were little used because of the danger involved. The advantages of three dimensional X-ray fluoroscopy are many if the X-ray intensity could be reduced to a level permitting the surgeon to operate under the direct beam of the X-ray tubes without danger of over exposure. But heretofore because of the very intense X-ray radiation required, the actual safe time was limited to a few minutes. Since the X-ray dosage is cumulative in nature, the danger to a surgeon is evident.

By the present invention there is provided a system wherein X-rays of little more than tolerance level are used, permitting the surgeon to operate under the direct beam of the X-ray radiation for a much greater period of time with a minimum of danger.

The invention may be clearly understood from the following detailed description with reference to the accompanying drawings, wherein:

Figs. 2 to 5 show various forms of detector devices which may be employed therein;

Fig. 6 is a diagrammatic illustration of another form of the electronic fluoroscope apparatus provided by the invention;

Figs. 7 and 8 illustrate other forms of the X-ray producing means which may be employed in the apparatus of Fig. 1 or Fig. 6;

Figs. 9 and 10 show different embodiments of a fluoroscope which does not employ electronic devices.

Fig. 11 is a diagrammatic illustration of still another form of the electronic fluoroscope;

Fig. 12 illustrates a different form of X-ray tube which may be employed;

Fig. 14 is a diagrammatic illustration of another embodiment of the stereoscopic apparatus;

Fig. 14A is a fragmentary enlarged face view taken along line 14A—14A of Fig. 14;

Fig. 16 illustrates a further embodiment of the invention utilizing color.

Figure 1:
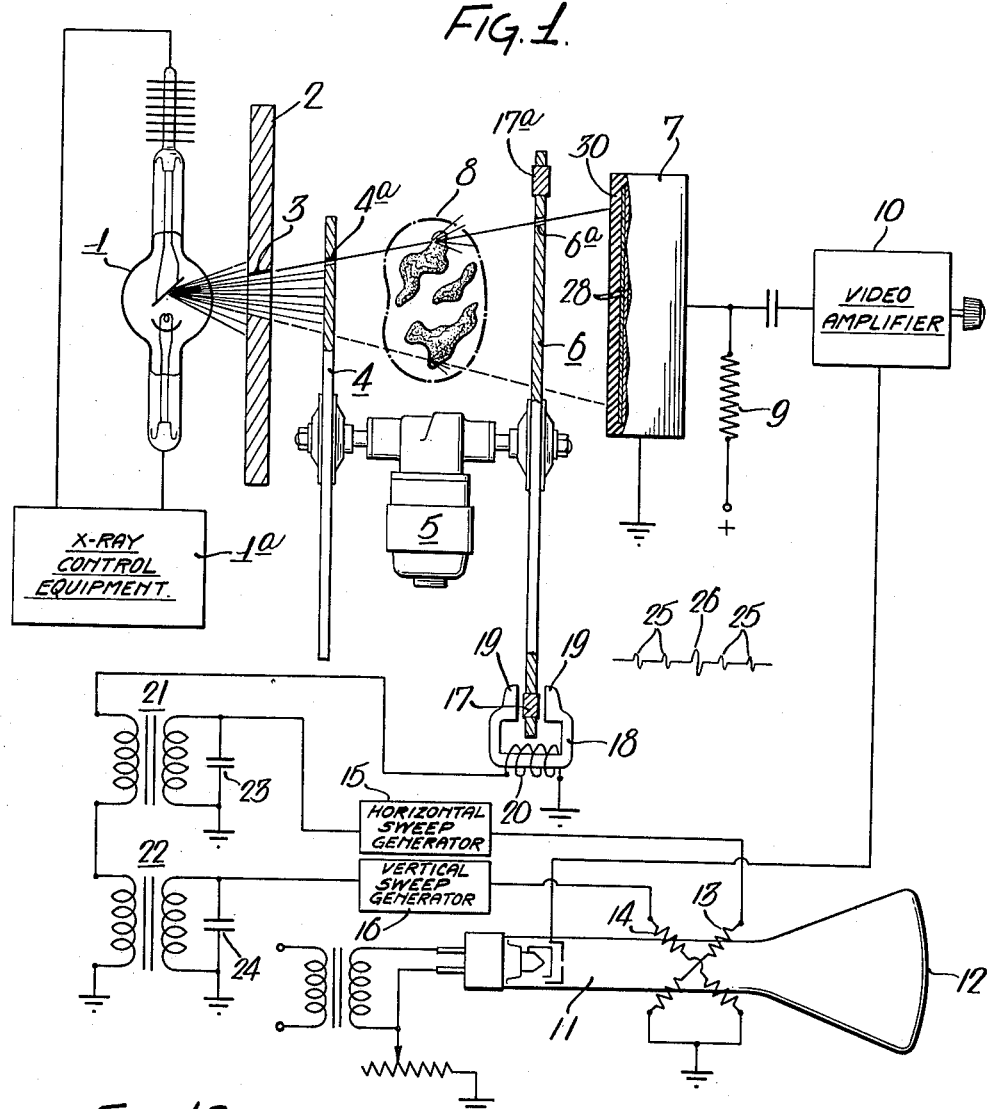
Fig. 1 is a diagrammatic illustration of one form of an electronic fluoroscopic apparatus provided by the present invention.
Figure 1B:
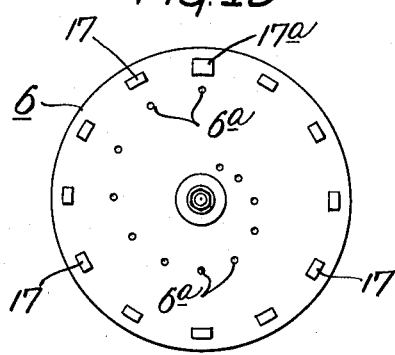
Figs. 1A and 1B are face views of the rotating disks employed in the apparatus of Fig. 1.
Figure 1A:
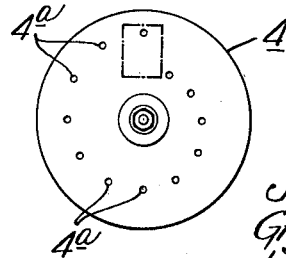

Referring first to Fig. 1, a conventional X-ray tube is shown at 1 which constitutes a source of X-ray radiation. Conventional control equipment for the tube is represented at 1a. An apertured shield 2, which may be formed of lead, is arranged to prevent passage of the X-rays from tube 1 except through the aperture 3. A scanning disk 4, which may be formed of lead or other material impervious to X-rays, is arranged in the path of the X-rays and is provided with a series of holes 4a arranged in a spiral, as shown in Fig. 1A. Such a disk is well known from the early art of television. Rotation of the disk produces line-by-line scanning of an area represented in outline in Fig. 1A. The disk 4 is rotatably driven by a synchronous motor 5. A second lead disk 6 may be provided, as shown, to limit the radiation reaching a detector or translator 7 to the direct radiation from the X-ray tube, thus excluding the secondary radiation from the object 8 which is to be viewed and which is interposed between the disks as shown. In the system illustrated, wherein the X-ray tube is of a type in which the X-rays are divergent, the disk 6 is somewhat larger than disk 4 and, as shown in Fig. 1B, it also is provided with spirally arranged holes 6a which correspond in number and angular position with the holes in the disk 4. The two disks are similarly oriented and they are synchronously driven by the motor 5.

As the disks are rotated by the motor 5, the disk 4 causes X-ray beam-scanning of the object 8 in horizontal lines, by reason of the fact that the aperture 3 of the stationary shield 2 limits the projected X-rays to an area over which the holes of the scanning disk 4 are successively effective to permit passage of the X-rays. Although impingement of the X-rays on the object 8 will produce secondary X-rays, only the direct or primary X-rays passing through the said object will be permitted by disk 6 to impinge on the detector or translator 7. The latter produces varying current flow through a resistor 9 according to the varying X-ray transparency of the object 8. The varying voltage, or signal, produced across resistor 9, by reason of the current flow therethrough, is applied to a video amplifier 10 and thence to the control grid of a conventional cathode ray oscilloscope 11. The electron beam of the cathode ray tube 11 is caused to scan the fluorescent screen 12 in synchronism with the X-ray scanning of the object 8, by means of the arrangement now to be described.

The horizontal and vertical deflecting coils 13 and 14 of tube 11 are supplied with deflecting or sweep voltages from the horizontal and vertical sweep generators 15 and 16. These generators are of the pulse-driven type commonly employed in television, and they are driven by pulses generated by rotation of the disk 6. To this end, there are provided on disk 6 (Fig. 1B) soft iron inserts 17 which are radially aligned with the holes 6a. One of the inserts 17a is of larger radial dimension than the others. A stationary magnet 18 is cooperatively associated with the disk 6, as shown in Fig. 1, and has pole pieces 19 substantially equal in width to the insert 17a. A coil 20 is wound on the magnet and is connected to the series-connected primaries of transformers 21 and 22. The transformer secondaries are connected respectively to the horizontal and vertical sweep generators. Capacitors 23 and 24 of different values are connected across the secondary windings. During rotation of the disk 6, the inserts 17 produce pulses 25, and once during each revolution of the disk, the insert 17a produces a larger and broader pulse 26. The pulses 25 are the horizontal or line synchronizing pulses, while the pulse 26 is the vertical or frame synchronizing pulse. The secondaries of transformers 21 and 22 are respectively tuned by capacitors 23 and 24 to the horizontal and vertical frequencies. Therefore, only the horizontal synchronizing pulses 25 are transmitted to the horizontal sweep generator 15, and only the vertical synchronizing pulses 26 are transmitted to the vertical sweep generator 16.

It will be seen from the foregoing that the line scanning frequency is determined by the number of holes in the disks and is equal to the product of the number of holes and the revolutions per second. By way of example, there may be 250 holes in each disk and the disks may be rotated at a speed of twenty revolutions per second, in which case the line scanning frequency will be 5000. The vertical scanning frequency is, of course, equal to the number of revolutions per second.

From the foregoing description, it will be seen that the scanning motion of the electron beam in the cathode ray tube 11 produces on the fluorescent screen 12 a line-by-line representation of the X-ray transmission characteristics of the object 8. Since the vertical or scanning frequency is above the threshold of persistence of human vision, a clear image will be observable on the screen.

It will be apparent that an electronic fluoroscopic system of the character shown in Fig. 1 enables the use of low intensity X-rays and this is highly advantageous for the reasons hereinbefore pointed out. Moreover, by means of such a system, it is readily possible to provide a plurality of cathode ray tubes for viewing by a number of persons. This merely involves connecting a number of cathode ray tubes to the video amplifier 10 and to the sweep generators 15 and 16.

The detector or translator 7 of Fig. 1 may take any suitable form. Four possible forms thereof are shown in Figs. 2 to 5. Referring to Fig. 2, the form there shown comprises a partially evacuated (e. g. 2 cm. pressure) ionization chamber 27 provided with very thin metal sheets or layers 28 of materials of decreasing atomic weights (e. g. lead, silver and aluminum) from front to back, and also provided with a plate or anode 29. The casing forming said chamber may be composed of plastic material and may be provided with an X-ray transparent front closure 30. The anode 29 is connected to resistor 9, while the sheets or layers 28 are all grounded. A suitable positive potential, e. g. 100 volts, is supplied to the lower end of resistor 9. In operation varying electron flow is produced by impingement of the X-rays on sheets 28, there being a multiplying action from sheet to sheet as shown in Fig. 2A. This type of chamber is sensitive to the quality or hardness of the X-ray beam and is most sensitive to hard radiation.

Fig. 3 shows the same device with accelerating potentials applied between the thin metal sheets from a voltage divider 31. This arrangement causes the electrons produced by impingement of the X-ray beam on the first sheet to be accelerated to a sufficient speed to produce secondary electrons from the next sheet, and the same action from sheet to sheet, so that there is a multiplying action as in the well known electron multiplier tubes.

Fig. 4 shows a simple detector which utilizes a fluorescent screen 32 and a photocell 33 which may be of the electron multiplying variety. The radiation produced when the X-ray beam impinges on the fluorescent screen 32 produces electron emission from the photo-emissive cathode in the photocell, as is well known in the art, the amount of current flowing being determined by the integrated radiation from the entire surface of the screen.

Fig. 5 shows a detector which comprises a grid arrangement of a multiplicity of Geiger counters 34 having associated resistors 35, all within a supporting casing 36, the counters being connected in multiple. Each of the counters may be of the form shown in Fig. 5A, comprising a glass envelope 37, a central ball electrode 38 and a ring electrode 39. In such arrangement, the number of counters triggered at any instant will depend upon the intensity of the incident radiation and will determine the voltage drop across the resistor 9. As the X-ray intensity fluctuates, the output voltage or signal varies accordingly.

Referring now to Fig. 6, there is shown a system or apparatus of the same general character as shown in Fig. 1 but adapted to utilize secondary radiation rather than direct radiation. In this instance, the disk 6b is X-ray transparent and it is provided with spirally-arranged small lead disks 40 corresponding in number and arrangement to the holes in the smaller scanning disk 4. The small lead disks 40 may be in the form of inserts disposed in openings provided in the disk 6b. Aside from these modifications, the system is the same as that of Fig. 1 and the elements are similarly designated.

In operation of this system, the direct X-rays which pass through the scanning disk 4 are not permitted to reach the detector or translating device 7 because they are blocked by the lead disks 40. However, the secondary and scattered X-rays produced by impingement of the direct X-rays on the object 8 are enabled to pass through the X-ray transparent disk 6b and impinge on the detector 7. The resultant signal produced by the detector is proportional to the amount of secondary and scattered X-rays from the object 8, and not the X-ray transparency of the object. Since the quality or wave length of secondary X-rays produced by an X-ray beam is dependent upon the hardness of the primary beam and the atomic number of the element producing the secondary radiation, a mixture of compounds containing different elements will produce a mixture of X-rays of different hardness or quality as well as different intensities. Consequently, the apparatus of Fig. 6 provides a means for analysis and determination of composition and structure. In this connection, a detector, such as shown in Fig. 2, may be employed which is sensitive to the quality or hardness of the impinging X-rays.

In Figs. 7 and 8, there are shown two different forms of X-ray producing devices either of which may be employed in the system of Fig. 1 or Fig. 6, instead of employing a conventional X-ray tube. In Fig. 7, there is provided an electron tube 41 having a cathode structure 42 which produces a broad spread of electrons as indicated at 43. The electrons impinge on a thin target 44 to which a high positive voltage is applied and which is formed of a metal of high atomic weight such as lead, gold or tungsten. Impingement of the electrons on the target cause radiation of X-rays in all directions in each point of impingement. Associated with the target 44 is an X-ray directing member 45 which may comprise a lead body having parallel numerous X-ray transmissive elements 46 which may be very small openings or passages. The member 45 is broadly the same as the X-ray lens disclosed and claimed in Bartow et al., Patent No. 2,638,554 issued May 12, 1953. The said member may be made as described in said patent, i. e. by forming slots or recesses in sheet-like segments and then laminating the segments. The transmissive elements of said member may be of the order of .0001" to .025" in diameter. By this arrangement, only parallel X-rays are permitted to enter the space in which an object is positioned for examination. An important advantage of this device is that the heat dissipation is rapid because of the fact that the electrons are spread out or diffused rather than being concentrated in a narrow beam.

This device may be employed in the system of Fig. 1 or Fig. 6 in place of the tube 1 and the shield 2. It is essential, of course, that the X-ray directing member 45 confine the projected X-rays to an area which will be scanned line-by-line by the holes in the scanning disk. Since the projected X-rays are parallel, the disk 6 or 6b in the system of Fig. 1 or Fig. 6 will be of the same size as the scanning disk.

In Fig. 8, there is shown an X-ray producing device in which the source of X-rays is a radioactive isotope 47 within a lead chamber 48 provided with an X-ray directing member 49 having numerous small X-ray transmissive elements 50, such as parallel openings or passages, to permit passage only of parallel rays. By way of example, the isotope may be radioactive cobalt. This device may also be used in the system of Fig. 1 or Fig. 6 in place of the tube 1 and shield 2. Here again, it is necessary that the ray-directing member 49 confine the projected X-rays to an area which will be scanned line-by-line by the holes in the scanning disk.

In Figs. 9 and 10, there are shown two forms of a fluoroscope in which the image is produced directly by impingement of X-rays on a fluorescent screen. The device of Fig. 9 comprises a radioactive isotope 51, a shield 52 having a small aperture 53 therein and a fluorescent screen 55, all arranged as shown. An object to be viewed, as represented at 54, is placed between the shield 52 and the screen 55. The shield 52 is formed of a material, such as lead, which is impervious to X-rays. The aperture 53 is extremely small and permits passage of X-rays only within an angle as indicated. By this arrangement, an image is produced on the screen 55, the size of the image being determined by the distance between the screen and the apertured shield or plate 52.

The device of Fig. 10 comprises a radioactive isotope 56, an X-ray directing member 57 having numerous small X-ray transmissive elements 58, such as parallel openings or passages, and a fluorescent screen 59, all arranged as shown. An object 60 to be examined is placed between the screen 59 and the ray-directing member 57. By this arrangement, only parallel X-rays are projected toward the object. By closely spacing the passages 58 in member 57, an image of sufficient detail may be produced on the screen 59.

The devices of Figs. 9 and 10 are advantageous in that they are extremely simple and they could be utilized in instances where it is undesired to have a rather elaborate apparatus. Moreover, they lend themselves to portability and radiographic photography.

Referring now to Fig. 11, there is shown another embodiment of the invention involving X-ray scanning of the object to be examined without the use of a scanning disk. In this instance, there is provided a special X-ray tube 61 similar in construction to a cathode ray oscilloscope or television tube, with beam-forming electrodes and associated deflecting coils 62 and 63. The electron beam 64 from the electron gun of the tube is accelerated by a high positive voltage applied to an X-ray emitting target 65 which may be formed of very thin metal of high atomic weight. The target 65, when bombarded with the high speed electrons of the beam 64, rapidly decelerates the electrons, with resultant production of very short wave radiation, i. e. X-rays, which radiate in all directions from the point of impact of the cathode ray beam. Certain of the X-rays pass through X-ray transmitting elements 66, such as parallel apertures or passages, of a ray directing member 67 which may be formed of lead or lead alloy.

On the opposite side of the space in which an object 68 may be placed is a member 69, similar to member 67, which permits only primary or direct X-rays to impinge upon the detector or translating device 70. The signal produced by the latter is passed through a video amplifier 71 and supplied to the control grid of a conventional cathode ray tube 72 having deflecting coils 73 and 74. The scanning action of tube 72 is synchronized with that of tube 61 by virtue of the fact that a vertical sweep generator 75 and a horizontal sweep generator 76 supply deflecting voltages to both tubes.

In operation of the system, the scanning action of tube 61 in conjunction with the lens 67 produces X-ray scanning of the object 68. The detector or translating device 70 produces a signal which varies according to the X-ray transmission characteristics of the object 68. This signal varies the intensity of the electron beam of tube 72, while that tube is going through the same scanning cycle as the tube 61. Consequently, there is produced on the screen of the tube 72 a representation of the X-ray transmission characteristics of the object 68.

During operation of the system as set forth above, the electron beam of tube 61 is deflected across the target 65 by virtue of the varying magnetic fields produced by the deflecting coils 62 and 63. Thus the point of impingement of the electron beam 64 on target 65 continually changes, and each point of impingement is actually an X-ray radiating source. As the electron beam scans the target X-ray beams are emitted successively in different paths by virtue of the holes or passages in the X-ray directing member 67. These passages may be arranged in rows corresponding to line-by-line scanning of the target 65.

By means of an arrangement such as shown in Figure 11, the X-ray beam area may be accurately controlled. It will be seen that the horizontal and vertical deflecting voltages from generators 75 and 76 are supplied to the deflecting coils 62 and 63 through amplifiers 77 and 78. By means of the horizontal and vertical centering controls 79 and 80, the positioning of the electron beam in tube 61 may be accurately controlled. In addition, there are provided sweep amplitude controls 81 and 82, and ganged size controls 83 and 84, all of these various controls being similar to those commonly used in the television art. By means of these controls it is possible accurately to control the area over which the X-ray beams are caused to scan. In this way, it is possible to cause the X-rays to be emitted from any selected portion of the target 65, eliminating the need for shutters or the like to control the X-ray beam area.

It is also possible in a system of this character to derive at least some of the operating voltages for tube 61 from one of the sweep generators. Thus, in the system as shown, a portion of the horizontal sweep voltage is applied to an amplifier 85 through a voltage controlling potentiometer 86. The tube 85 supplies the amplified voltage to a step-up autotransformer 87, with which there is associated a rectifier 88. The high frequency high voltage is rectified by the rectifier tube 88 and is filtered by a high voltage capacitor 89, and the resulting high positive voltage is supplied to the target 65 of tube 61.

The filament current for tube 61 may be supplied through an amplifier 90 having an associated potentiometer control 91 and an output transformer 92. The control 91 is preferably ganged with the size controls 83 and 84 in a manner to compensate for variation in X-ray intensity as the scanned area is varied. Thus as the scanned area is made smaller, the intensity of the electron beam may be reduced.

In addition to the above-mentioned controls, a conventional contrast control 93 is preferably provided on the video amplifier 71 to vary the contrast of the image produced on the screen of tube 72.

In Fig. 12, there is shown another form of X-ray tube which may be used in place of the tube 61 in Fig. 11. The tube 94 in Fig. 12 has an inclined target 95 which is scanned by the electron beam 96 under the influence of deflecting coils 97 and 98. An X-ray directing member 99, similar to that in Fig. 11, is arranged to permit passage of directed rays only. Due to the inclination of the target 95, it is necessary to vary the focus of the electron beam. This may be done by introducing a portion of the sweep voltage into the focus coil in such a manner as to cause the focal point of the electron beam always to coincide with the surface of the slanted target. The orientation of the target in respect to the electron beam scanning axis will determine whether horizontal or vertical sweep voltages should be used to correct the focal distance.

Figure 13:
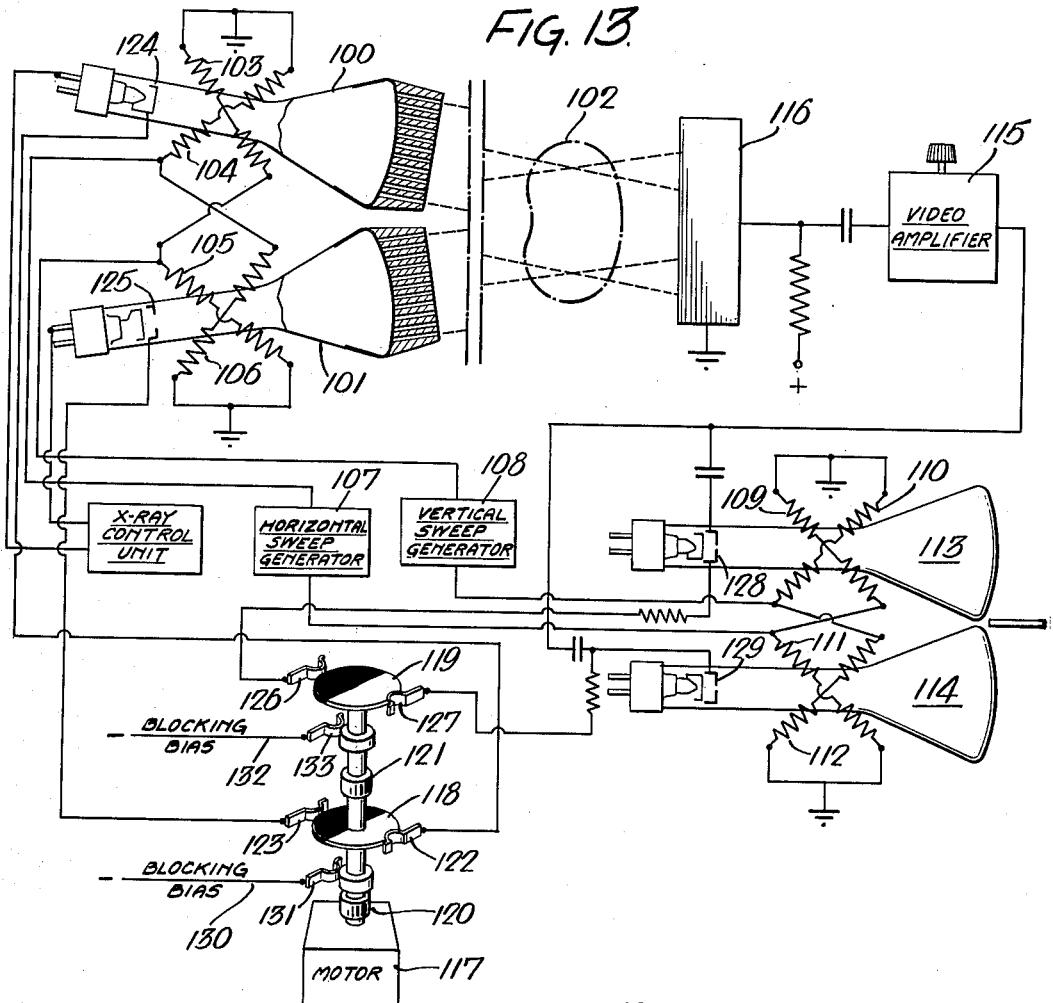
Fig. 13 is a diagrammatic illustration of stereoscopic apparatus embodying the invention.

Referring now to Fig. 13, there is shown an application of the invention to stereoscopic fluoroscopy. Two scanning type X-ray tubes 100 and 101, generally similar to tube 61 of Fig. 11, are arranged for alternate X-ray scanning of a space in which an object 102 may be placed for examination. The deflection coils 103, 104 and 105, 106 of the two tubes are supplied from horizontal and vertical sweep generators 107 and 108 which also supply deflecting voltages to deflecting coils 109, 110 and 111, 112 of two viewing tubes 113 and 114 arranged for viewing by the eyes of an observer. The tubes 113 and 114 are conventional cathode ray tubes. The control grids of these tubes are connected to the output of a video amplifier 115 whose input is connected to a detector or translating device 116. The latter translates received X-rays into a signal as in the previous embodiments.

The X-ray tubes and the viewing tubes are keyed in synchronism by means of the arrangement shown, comprising a motor 117 driving two keying discs 118 and 119. Insulating couplings 120 and 121 serve to insulate these components from one another. The discs are similar and are similarly oriented, and each comprises a semi-circular conducting portion and a semi-circular non-conducting portion. Diametrically opposed brushes 122 and 123 are associated with disc 118 and are connected respectively to electrodes 124 and 125 of tubes 100 and 101. Similar brushes 126 and 127 are associated with disc 119, and are connected respectively to electrodes 128 and 129 of the viewing tubes 113 and 114. A negative blocking bias is applied alternately to tubes 100 and 101 through disk 118 by means of a connection 130 which is electrically connected to the conductive portion of disk 118 through brush 131. In like manner, a negative blocking bias is applied alternately to tubes 113 and 114 through disk 119 by means of a connection 132 which is electrically connected to the conductive portion of disk 119 through brush 133. By this arrangement, the tubes 100 and 101 are rendered operative alternately, and the tubes 113 and 114 are also rendered operative alternately in synchronism with the keying of tubes 100 and 101. The blocking biases are of sufficient magnitude to completely block electron flow in the tubes. Each rotating disk applies a blocking bias alternately to the two tubes controlled by said disk, during each revolution of the disk.

The result of synchronizing the X-ray tubes and the cathode ray tubes is that one cathode ray tube images the shadows from one X-ray tube only, and the other cathode ray tube images the shadows from the other X-ray tube only. As the two X-ray tubes are separated by a small horizontal distance, the two sets of shadows are displaced on the screens of the viewing tubes an amount depending on the depth of the opaque object. By virtue of normal stereoscopic vision, the observer receives a three dimensional image. The spacing of the X-ray tubes 100 and 101 determines the convergence angle of the X-rays directed from the respective tubes to the object. By increasing the spacing in relation to normal eye spacing, the stereoscopic effect is enhanced or amplified.

As a variation of the above-described system, a statistical type detector may be employed, as hereinbefore described, which will respond mainly to secondary X-rays produced by impingement of the primary X-rays on the object being examined. This will result in an image which is dependent upon the ability of the various materials in the object being examined to produce and scatter secondary X-rays. Such modified system would be useful in diagnostic or analytic examination of an object.

Referring now to Fig. 14, there is shown another form of the stereoscopic system employing a single X-ray tube and a special lens or ray directing device. The X-ray tube 134 is similar to the X-ray tube of the preceding embodiment, but in this instance there is associated with the tube a ray directing member 135 having alternate rows of holes at angles to each other, as shown in Fig. 14A, so that the X-ray beams from the odd numbered rows of holes are angled in one direction, while the X-ray beams from the even numbered rows of holes are angled in a different direction. Consequently, as the electron beam of tube 134 goes through its scanning motion, alternate X-ray line scannings of the object 136, at two different angles, are produced.

As in the preceding embodiment, a pair of cathode ray viewing tubes 137 and 138 are provided, and the electron beam intensities thereof are varied by means of a signal supplied from a detector 139 through a video amplifier 140. Vertical and horizontal sweep generators 141 and 142 supply the scanning voltages to the three tubes 134, 137 and 138, so that the scanning motions of the electron beams of said tubes are synchronized.

In this instance, the viewing tubes 137 and 138 are rendered operative alternately in synchronism with the alternate X-ray line scannings of the object 136. This may be accomplished by the use of a conventional Eccles-Jordan trigger circuit 143 comprising two tubes 144 and 145. As is well understood, such a trigger circuit has two stable circuit conditions, one with tube 144 conducting and the other with tube 145 conducting. In this instance, the change from one condition to the other is produced by means of a positive pulse signal 146 which is derived from the horizontal sweep generator 142 and applied to the grid-cathode circuits of tubes 144 and 145. The voltages from the plates of the latter tubes are applied respectively to the control grids of the two cathode ray tubes 137 and 138, through isolating resistors 147 and 148, to effect alternate operation of these tubes. The cathode voltage of the two cathode ray tubes is adjusted by the cathode voltage control 149 to the correct value for proper keying.

The operation of this system is essentially the same as in the case of the preceding embodiment. The only differences are that in this instance alternate X-ray line scannings of the object, at two different angles, are produced by means of the special lens or ray directing member 135 in association with a single X-ray tube 134, and the viewing tubes 137 and 138 are rendered operative alternately in synchronism with the line scannings.

Figure 15:
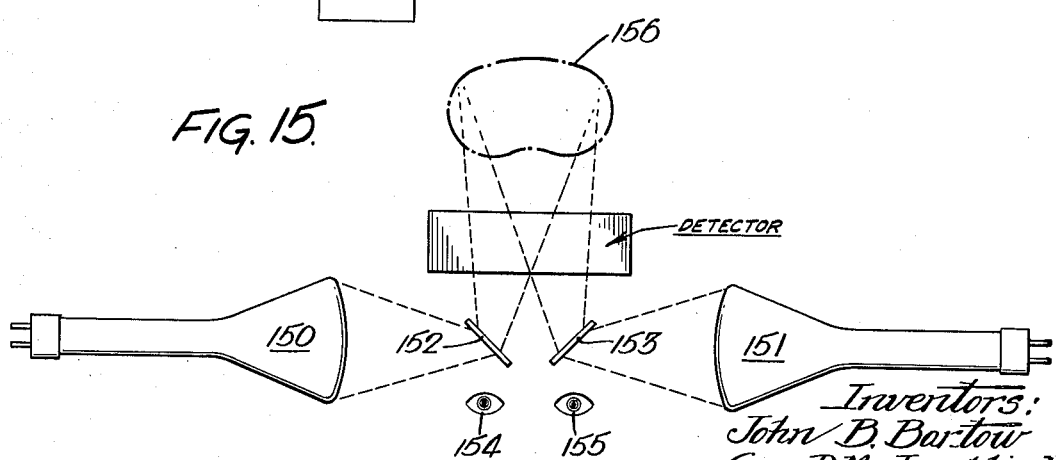
Fig. 15 shows a viewing arrangement which may be employed in a stereoscopic system.

In Fig. 15 there is shown a viewing arrangement which may be employed in the systems of Figs. 13 and 14. The cathode ray tubes 150 and 151 may be arranged with their screens opposing each other, and a pair of 45° mirrors 152 and 153 may be arranged as shown for viewing by the observer's eyes represented at 154 and 155. If the arrangement is such that the object 156 is in line with the observer's eyes, it is as though the observer were seeing the object directly. This arrangement is useful in surgery and like applications, as the surgeon can perform operations on the object while seemingly seeing it directly.

In Fig. 15 the broken lines representing X-ray passage through the object to the detector are convergent, which means that a convergent lens as shown in the aforementioned patent is employed in association with each of the X-ray tubes in the system of Fig. 14. The advantage of this is illustrated in Figs. 25 to 28 of the above-mentioned patent and is described in the patent specification (line 40, column 9 to line 18, column 10). This permits each eye to see in true perspective, and causes true stereoscopic viewing by the two eyes. This is very important in cases of surgery, bone setting, injections, etc., as the doctor is able to see each part of the object in true relation to other parts and is also able to see his instruments in true relation to any part of the object.

It should be noted that the point-by-point X-ray scanning of the object or an area thereof, achieved by the use of the X-ray tube and lens in the systems of Figs. 11, 13 and 14, causes much less X-ray exposure of each point during a given time than if each point were continuously subjected to X-ray exposure. Conversely, the scanning method allows much longer time for a doctor to work without increasing the X-ray exposure.

In addition to embodiments of the character hereinbefore described, the present invention contemplates the use of color in a system of X-ray fluoroscopy to obtain better differentiation between different depths and different opacities of various objects or materials in an object to be examined. This is particularly advantageous in a stereoscopic system, as it aids the eyes in determination of depth, and permits better contrast between different layers.

For the purpose of disclosure, there is shown in Fig. 16 a simple system adapted for use of color. An X-ray tube 157 of the scanning type and an associated ray directing member 158 produce X-ray scanning of the object 159, and a detector or translating device 160 produces a signal which is supplied through video amplifier 161 to the control grid of a cathode ray viewing tube 162. The screen 163 of tube 162 is composed of several (e. g. three) layers of fluorescent materials that fluoresce with different colors when excited by an electron stream. An electron stream possesses the peculiar property that most of the ionization or fluorescence produced by the electron stream occurs when the electrons have slowed down to a very low velocity. Penetration of an electron stream into a fluorescent screen is dependent upon the velocity of the electrons, and maximum ionization occurs just before the beam terminus. With a multi-layer screen, as provided in cathode ray tube 162, the maximum fluorescence will take place in the layer where the electron beam has only a very low velocity. Therefore, the desired color effects may be obtained by varying a controlling voltage applied to an electrode of the cathode ray tube. This may be done by varying the accelerating potential, or by varying a focusing potential, or by varying the anode voltage.

In the system as illustrated, different voltages are applied to the X-ray tube 157 and the cathode ray tube 162 during successive scannings of the X-ray tube screen. A motor 164 drives a rotatable contact arm 165 of a switch having three stationary contacts 166, 167 and 168 which are equally angularly spaced. Connected to the latter contacts as shown are resistors 169 and 170. A high positive voltage, e. g. 100 kilovolts is applied over connection 171 to the switch arm 165. Contact 168 is connected to electrode 172 of the X-ray tube 157 and to the ungrounded end of a voltage divider 173, which preferably has a ratio of ten to one, although this will depend upon the design of the cathode ray picture tube. The tap of the voltage divider is connected to electrode 174 of the cathode ray tube 162.

The electrons beams of tubes 157 and 162 are given synchronous scanning motions by means of vertical and horizontal sweep generators 175 and 176. The vertical scanning is synchronized with the rotation of contact arm 165 in a manner now to be described. The motor 164 drives a disk 177 which is formed of non-magnetic material and which carries three soft iron elements 178, 179 and 180 which are equally angularly spaced. A stationary magnet 181, having poles 182, is cooperatively associated with the disk as shown. A coil 183 is wound on the magnet and is connected to the vertical sweep generator 175. As each of the soft iron elements on disk 177 passes between the magnet poles, a pulse is generated and is supplied to the vertical sweep generator to drive the same through a scanning cycle. The arrangement is such that a vertical or frame scanning cycle takes place during each interval while the arcuate contact portion of arm 165 is in engagement with one of the associated stationary contacts.

As the arm 165 rotates, it causes application of different voltages to the tubes 157 and 162 by virtue of the voltage drops in the resistors 169 and 170. Preferably, the resistors have such values that when the arm 165 is on contact 166, a voltage of approximately 50 kilovolts is applied to the tube 157, and when the arm is on contact 167, a voltage of approximately 75 kilovolts is applied to said tube. Of course, when the arm is on contact 168, the full high voltage, approximately 100 kilovolts, is applied to said tube. In each instance, the voltage applied to the cathode ray tube 162 is approximately one-tenth of the voltage applied to tube 157, due to the voltage divider 173. As indicated above, each voltage is preferably applied for the duration of one complete scan of the screens of the tubes 157 and 162.

Considering the operation, during the application of the lowest voltage to the X-ray tube 157, the latter produces relatively soft X-rays which penetrate only the parts of the object 159 of low density. At the same time, a correspondingly low voltage is applied to the cathode ray tube 162 and causes low velocity of the electron beam in said tube. Consequently, the signal supplied to tube 162 is reproduced on the screen 163 of that tube in the color determined by the fluorescence of the first screen layer.

During application of the next higher voltage, the X-ray tube 157 produces harder X-rays which penetrate the moderately dense portions of the object 159, and at the same time the electron beam of the cathode ray tube 162 is given a velocity sufficient to penetrate to the intermediate layer of the screen 163. Consequently, the signal is reproduced in the color determined by the fluorescence of the intermediate layer.

During application of the highest voltage, the X-ray tube 157 produces hard X-rays which penetrate even the very dense portions of the object 159, and at the same time the electron beam of the tube 162 is given a velocity sufficient to penetrate to the outer layer of the screen 163. Consequently, the signal is reproduced in the color determined by the fluorescence of the outer layer.

The result of this operation is the production of a composite multi-color image on the screen 163 of the viewing tube 162. Obviously, the system can be extended to provide a greater number of colors. Moreover, the color-producing arrangement can be employed in a stereoscopic system such as hereinbefore described.

From the foregoing description it will be seen that the invention provides various arrangements for use in fluoroscopic apparatus. It will be understood, of course, that the embodiments illustrated and described are for the purpose of disclosure and are not intended to limit the invention.

We claim:

1. In a system of stereoscopic X-ray fluoroscopy; means for alternately effecting X-ray scannings, at two different angles, of a space in which an object may be placed for examination; a device arranged to receive X-rays emanating from said space and adapted to effect translation of received X-rays into an electrical signal; a pair of cathode ray receiving tubes arranged for observation of their respective screen images by the eyes of an observer; means for utilizing said signal to control the intensity of the electron beams of said tubes; and means for effecting alternate electron scannings in said tubes in synchronism with the alternate X-ray scannings of said space.

2. A system according to claim 1, including means for rendering said cathode ray tubes alternately operative in synchronism with the alternate X-ray scannings of said space.

3. A system according to claim 1, further including means for directing X-rays through the object toward two spaced focal points.

4. In a system of stereoscopic X-ray fluoroscopy; a pair of X-ray projecting tubes arranged to radiate X-rays, at two different angles, into a space in which an object may be placed for examination, each of said tubes including means for forming an electron beam, an X-ray emitting member on which said beam impinges, and means for deflecting said beam; means for rendering said tubes alternately operative; a device arranged to receive X-rays emanating from said space and adapted to effect translation of received X-rays into an electrical signal; a pair of cathode ray receiving tubes arranged for observation of their respective screen images by the eyes of an observer; means for utilizing said signal to control the intensity of the electron beams of said cathode ray tubes; means for effecting synchronized scanning motions of the electron beams of all of said tubes; and means for rendering said cathode ray tubes alternately operative in synchronism with the alternate operation of said X-ray tubes.

5. A system according to claim 4, including motor-driven switching means for rendering said X-ray tubes and said cathode ray tubes alternately operative in synchronism.

6. In a system of stereoscopic X-ray fluoroscopy; a pair of X-ray projecting tubes arranged to radiate X-rays, at two different angles, into a space in which an object may be placed for examination, each of said tubes including means for forming an electron beam, an X-ray emitting member on which said beam impinges, and means for deflecting said beam; ray-directing means arranged cooperatively with each of said tubes; means for rendering said tubes alternately operative; a device arranged to receive X-rays emanating from said space and adapted to effect translation of received X-rays into an electrical signal; a pair of cathode ray receiving tubes arranged for observation of their respective screen images by the eyes of an observer; means for utilizing said signal to control the intensity of the electron beams of said cathode ray tubes; means for effecting synchronized scanning motions of the electron beams of all of said tubes; and means for rendering said cathode ray tubes alternately operative in synchronism with the alternate operation of said X-ray tubes.

7. In a system of stereoscopic X-ray fluoroscopy; an X-ray projecting tube arranged to radiate X-rays into a space in which an object may be placed for examination, said tube including means for forming an electron beam, an X-ray emitting member on which said beam impinges, and means for deflecting said beam; ray-directing means arranged cooperatively with said tube and adapted to effect partial scannings of said space by said X-rays alternately at two different angles; a device arranged to receive X-rays emanating from said space and adapted to effect translation of received X-rays into an electrical signal; a pair of cathode ray receiving tubes arranged for observation of their respective screen images by the eyes of an observer; means for utilizing said signal to control the intensity of the electron beams of said cathode ray tubes; means for effecting synchronized scanning motions of the electron beams of all of said tubes; and means for rendering said cathode ray tubes alternately operative in synchronism with the alternate X-ray scannings of said space.

8. A system according to claim 7, including a trigger circuit, having two stable operating conditions, for rendering said cathode ray tubes alternately operative.

9. In a system of stereoscopic X-ray fluoroscopy; an X-ray projecting tube arranged to radiate X-rays into a space in which an object may be placed for examination, said tube including means for forming an electron beam, an X-ray emitting member on which said beam impinges, and means for deflecting said beam; ray-directing means arranged cooperatively with said tube and adapted to effect line scannings of said space by said X-rays alternately at two different angles; a device arranged to receive X-rays emanating from said space and adapted to effect translation of received X-rays into an electrical signal; a pair of cathode ray receiving tubes arranged for observation of their respective screen images by the eyes of an observer; means for utilizing said signal to control the intensity of the electron beams of said cathode ray tubes; means for effecting synchronized scanning motions of the electron beams of all of said tubes; and means for rendering said cathode ray tubes alternately operative in synchronism with the aforementioned line scannings of said space.

10. In a system of X-ray projecting fluoroscopy; an X-ray tube arranged to radiate X-rays into a space in which an object may be placed for examination, said tube including means for forming an electron beam, a beam-controlling electrode, an X-ray emitting member on which said beam impinges, and means for deflecting said beam; a device arranged to receive X-rays emanating from said space and adapted to effect translation of received X-rays into an electrical signal; a cathode ray receiving tube having a beam-controlling electrode and a screen composed of a plurality of layers of materials that fluoresce with different colors when excited by electrons; means for effecting synchronized scanning motions of the electron beams of said tubes; means for utilizing said signal to control the intensity of the electron beam of said cathode ray tube; and means for successively applying different voltages to said electrodes so as to produce a multi-color image on the screen of said cathode ray tube according to the X-ray susceptibility of said object.

11. A system according to claim 10, including a motor-driven selector switch for applying different voltages to said electrodes.

12. In a system of X-ray projecting fluoroscopy; an X-ray tube arranged to radiate X-rays into a space in which an object may be placed for examination, said tube including means for forming an electron beam, a beam-controlling electrode, an X-ray emitting member on which said beam impinges, and means for deflecting said beam; a device arranged to receive X-rays emanting from said space and adapted to effect translation of received X-rays into an electrical signal; a cathode ray receiving tube having a beam-controlling electrode and a screen composed of a plurality of layers of materials that fluoresce with different colors when excited by electrons; means for effecting synchronized scanning motions of the electron beams of said tubes; means for utilizing said signal to control the intensity of the electron beam of said cathode ray tube; and means for successively applying different voltages to said electrodes in synchronism with the frame scanning cycles of said tubes, so as to produce a multi-color image on the screen of said cathode ray tube according to the X-ray susceptibility of said object.

13. A method of stereoscopic X-ray fluoroscopy, which comprises alternately scanning by X-rays, from two different directions a space in which an object may be placed for examination, producing an electrical signal which varies according to the susceptibility of the object to X-rays impinged thereon during said scanning, and converting said signal alternately into two observable images synchronously with the alternate scanning of the object.

14. A method of X-ray fluoroscopy, which comprises scanning by X-rays a space in which an object may be placed for examination, varying the intensity of said X-rays during the scanning, producing an electrical signal which varies according to the susceptibility of the object to X-rays impinged thereon during said scanning, and converting said signal into an observable image having color characteristics according to the susceptibility of the object to different X-ray intensities.

15. In a system for producing a visual X-ray picture of an object, means for producing a narrow electron beam, an electron-excitable X-ray producing surface arranged to receive said electron beam and to emit X-rays into a space into which said object is placed, means for effecting scanning motion of said electron beam to cause the beam to scan said surface and thus cause successive emission of X-rays from different points of said surface, an X-ray directing member adjacent said surface having X-ray transmissive elements extending from different points of said surface but being otherwise non-transmissive to X-rays, whereby to direct X-rays from said points in different paths through the object, a device arranged to receive the X-rays after they pass through the object and adapted to effect translation of the received X-rays into an electrical signal whose amplitude varies according to the X-ray transmissivity of the object at the different points thereof, means for producing a second narrow electron beam, a fluorescent screen arranged to receive said second beam, means for effecting scanning motion of said second beam in synchronism with the scanning motion of said first beam, and means for moduating said second electron beam with said signal to produce on said fluorescent screen an X-ray picture of the object.

References Cited in the file of this patent

UNITED STATES PATENTS

| | | |
|---|---|---|
| 1,657,292 | Williamson | Jan. 24, 1928 |
| 1,838,537 | Dawillier | Dec. 29, 1931 |
| 1,961,713 | Simjian | June 5, 1934 |
| 2,009,498 | Kerr | July 30, 1935 |
| 2,066,715 | Centeno | Jan. 5, 1937 |
| 2,107,464 | Zworykin | Feb. 8, 1938 |
| 2,153,586 | Nicolson | Apr. 11, 1939 |
| 2,221,374 | Fransworth | Nov. 13, 1940 |
| 2,234,806 | Ploke | Mar. 11, 1941 |
| 2,297,478 | Kallmann | Sept. 29, 1942 |
| 2,298,942 | Hicks | Oct. 13, 1942 |
| 2,343,825 | Wilson | Mar. 7, 1944 |
| 2,388,170 | McCollum | Oct. 30, 1945 |
| 2,442,287 | Edwards | May 25, 1948 |
| 2,477,307 | Mackta | July 26, 1949 |
| 2,494,740 | Boucher | Jan. 17, 1950 |
| 2,531,583 | Ott | Nov. 28, 1950 |
| 2,555,424 | Sheldon | June 5, 1951 |
| 2,593,925 | Sheldon | Apr. 22, 1952 |
| 2,670,401 | Weinberg | Feb. 23, 1954 |

FOREIGN PATENTS

| | | |
|---|---|---|
| 418,224 | Great Britain | Oct. 2, 1934 |

OTHER REFERENCES

Physical Review, vol. #24, 1924, pp. 159,160.

Moon: Amplification of the Fluoroscopic Image; American Journal of Roentgenology and Radium Therapy, June 1948, pp. 886–888, vol. 59, No. 6.